(12) United States Patent
Ashtekar et al.

(10) Patent No.: US 9,457,765 B2
(45) Date of Patent: Oct. 4, 2016

(54) VEHICLE SEAT WITH A BELT BUCKLE

(71) Applicant: Johnson Controls GmbH, Burscheid (DE)

(72) Inventors: Bhagyesh Ashtekar, Goteborg (SE); Richard G. Lewis, Onsala (SE); Lennart Svensson, Torslanda (SE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 14/399,760

(22) PCT Filed: Jun. 20, 2013

(86) PCT No.: PCT/EP2013/062911
§ 371 (c)(1),
(2) Date: Nov. 7, 2014

(87) PCT Pub. No.: WO2014/001197
PCT Pub. Date: Jan. 3, 2014

(65) Prior Publication Data
US 2015/0123448 A1    May 7, 2015

(30) Foreign Application Priority Data
Jun. 28, 2012 (DE) .......................... 10 2012 013 081

(51) Int. Cl.
*B60R 22/26* (2006.01)
*B60N 2/60* (2006.01)
*B60R 22/18* (2006.01)

(52) U.S. Cl.
CPC ............. *B60R 22/26* (2013.01); *B60N 2/6009* (2013.01); *B60R 2022/1806* (2013.01)

(58) Field of Classification Search
CPC ...... B60R 22/02; B60R 22/021; B60R 22/26
USPC .................................................. 297/468, 481
See application file for complete search history.

(56) References Cited

U.S. PATENT DOCUMENTS

| | | | | |
|---|---|---|---|---|
| 3,287,061 A * | 11/1966 | Nicholas | ................. | B60R 22/02 297/481 |
| 4,948,195 A * | 8/1990 | Saunders | ............... | B60N 2/441 108/44 |
| 5,139,311 A | 8/1992 | Imai et al. | | |
| 5,248,356 A | 9/1993 | Shimada | | |
| 6,412,876 B2 * | 7/2002 | Nishide | .................... | B60R 22/26 297/188.01 |
| 6,595,587 B2 * | 7/2003 | Konishi | ............... | B60N 2/3013 296/65.01 |
| 7,229,135 B2 * | 6/2007 | Hyatt | ...................... | B60R 22/22 297/481 |
| 7,281,763 B1 * | 10/2007 | Hayashi | ............... | B60N 2/2893 297/253 |
| 7,931,335 B1 * | 4/2011 | Siklosi | ................. | B60N 2/6027 297/219.1 |
| 2004/0207245 A1 * | 10/2004 | Baylis | ..................... | B60R 22/02 297/481 |
| 2012/0043792 A1 * | 2/2012 | Murthy | .................. | B60N 2/065 297/233 |
| 2013/0093233 A1 | 4/2013 | Kajihara | | |

FOREIGN PATENT DOCUMENTS

| | | |
|---|---|---|
| DE | 34 39 077 A1 | 5/1986 |
| DE | 40 37 574 A1 | 5/1991 |

(Continued)

*Primary Examiner* — Sarah McPartlin
(74) *Attorney, Agent, or Firm* — McGlew and Tuttle, P.C.

(57) ABSTRACT

A vehicle seat (1) includes a backrest (10) and a seat part (2) which has a seat cushion (11). The seat cushion (11) has at least one recess (31, 32) for receiving at least one belt buckle (21, 22, 23). The at least one recess (31, 32) is partially delimited upwards in the vertical direction by a bridge (35).

20 Claims, 3 Drawing Sheets

(56) References Cited

FOREIGN PATENT DOCUMENTS

| DE | 102 53 176 A1 | 6/2004 |
| DE | 103 34 977 A1 | 3/2005 |
| DE | 10 2004 043 132 B3 | 10/2005 |
| DE | 10 2005 047 272 B3 | 4/2007 |
| FR | 2 885 851 A1 | 11/2006 |
| JP | H04-69262 U | 6/1992 |
| JP | H06-71267 U | 10/1994 |
| JP | 2000 272 473 A | 10/2000 |
| JP | 2003 205 822 A | 7/2003 |
| JP | 2009001211 * | 1/2009 |
| JP | 2010-89686 A | 4/2010 |

* cited by examiner

VEHICLE SEAT WITH A BELT BUCKLE

CROSS REFERENCE TO RELATED APPLICATIONS

This application is a United States National Phase Application of International Application PCT/EP2013/062911 filed Jun. 20, 2013 and claims the benefit of priority under 35 U.S.C. §119 of German Patent Application DE 10 2012 013 081.3 filed Jun. 28, 2012, the entire contents of which are incorporated herein by reference.

FIELD OF THE INVENTION

The invention relates to a vehicle seat with a belt buckle having a backrest and a seat part, which has a seat cushion, wherein the seat cushion has at least one recess for receiving at least one belt buckle.

BACKGROUND OF THE INVENTION

DE 10 2005 047 272 B3 discloses a vehicle seat of the type in question, in particular a rear seat for a motor vehicle. The vehicle seat here has a backrest and a seat part. A belt buckle which is fastened by means of an adapter to a crosspiece, which runs in the transverse direction, of the supporting structure of the vehicle seat is provided in a rear region, in the direction of travel, of the seat part.

In a later installation step, the structure of the backrest and the structure of the seat part are upholstered. In the process, a foam part is applied in each case to the structure of the backrest and to the structure of the seat part and is covered by a cover.

The foam part assigned to the seat part has a recess for the belt buckle. Said recess extends in the vertical direction through the foam part and in the direction of travel and in the transverse direction is approximately the size of the belt buckle. The recess is located in a rear region, in the direction of travel, of the foam part and is spaced apart from the rear end, in the direction of travel, of the foam part.

The belt buckle thus projects in the vertical direction through the foam part assigned to the seat part and is visible and operable. At the same time, the belt buckle bears approximately flush all the way round against the foam part, as a result of which gaps or cracks between the belt buckle and the foam part are avoided within the recess.

During the installation, the foam part is positioned in the vertical direction from the top downward on the structure of the seat part, wherein the belt buckle is guided through the recess and is fastened to the structure of the seat part. The foam part assigned to the backrest is subsequently positioned on, and fastened to, the structure of the backrest.

In some cases, for example if the foam part of the backrest is mounted first and the foam part of the seat part is mounted subsequently, a positioning of the foam part of the seat part from the top downward is not possible, and instead said foam part has to be positioned on the structure of the seat part in an approximately horizontal direction counter to the direction of travel. With this direction of movement of the foam part, the belt buckle cannot be guided through the recess described.

It would be conceivable to increase the recess to the rear as far as the rear end of the foam part. It would then be possible to install the foam part in the direction of movement described. The foam part could be inserted counter to the driving direction, in which case the recess would receive the belt buckle. The belt buckle would then bear against the foam part on the right and left in the transverse direction and at the front in the direction of travel. However, at the rear in the direction of travel, an undesirable opening in the form of a gap would remain between the belt buckle and the rear end of the foam part.

DE 103 34 977 A1 also discloses a vehicle seat of the type in question which has a seat part with a seat cushion which has a recess for receiving a belt buckle.

SUMMARY OF THE INVENTION

The invention is based on an object of improving a vehicle seat of the type mentioned at the beginning, in particular of enabling the foam part of the seat part to be installed in an approximately horizontal direction of movement and of avoiding gaps or other openings between the foam part and the belt buckle.

A vehicle seat according to the invention comprises a backrest and a seat part which has a seat cushion, wherein the seat cushion has at least one recess for receiving at least one belt buckle. The at least one recess here is partially bounded upward in the vertical direction by a bridge.

Owing to the fact that the at least one recess is partially bounded upward in the vertical direction by a bridge, a recess opening remaining behind the belt buckle in the direction of travel is covered upward and is therefore not visible.

The bridge preferably has a core material which is covered by a cover. This makes it possible to select a core material with desired properties, in particular with regard to the tearing strength, while the optical impression of the bridge corresponds to that of the seat cushion.

The core material of the bridge is advantageously an elastic material, preferably a rubber band. As a result, during the installation of the seat cushion, the bridge can be raised slightly in order to enable the belt buckle to slide through. The core material subsequently then contracts again and the bridge lies approximately flat in its original position.

The core material of the bridge is preferably sewn here onto the material of the seat cushion on the right and left of the recess in the transverse direction.

The cover of the bridge is preferably at least predominantly composed here of leather. Alternatively, the cover can also be composed of cloth or of a different material.

In a simple embodiment, a first recess, the extent of which in the transverse direction corresponds to the width of the first belt buckle, is provided.

In particular in the case of a vehicle seat having three seats, a second recess, the extent of which in the transverse direction corresponds to the sum of the width of the second belt buckle and of the third belt buckle, is advantageously provided.

In order to cover a gap remaining behind the belt buckle, the bridge is advantageously arranged in such a manner that a front end, in the direction of travel, of the bridge bears against a rear end, in the direction of travel, of the at least one belt buckle.

A surface of the bridge which lies at the top in the vertical direction preferably ends approximately flush with that surface of the seat cushion which lies at the top in the vertical direction. The impression of a uniform seat surface is advantageously produced by this means.

A passage through which the at least one belt buckle can be passed during the installation is advantageously provided in the vertical direction below the bridge. As a result, the installation of the seat cushion on the vehicle seat can advantageously be carried out in a simplified manner.

The seat cushion here is preferably designed as a foam part.

The seat cushion preferably extends in the transverse direction over the entire width of the vehicle seat.

The recess is advantageously of approximately rectangular design in cross section perpendicularly to the vertical direction.

The invention is explained in more detail below with reference to an advantageous exemplary embodiment which is illustrated in the drawings. However, the invention is not restricted to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
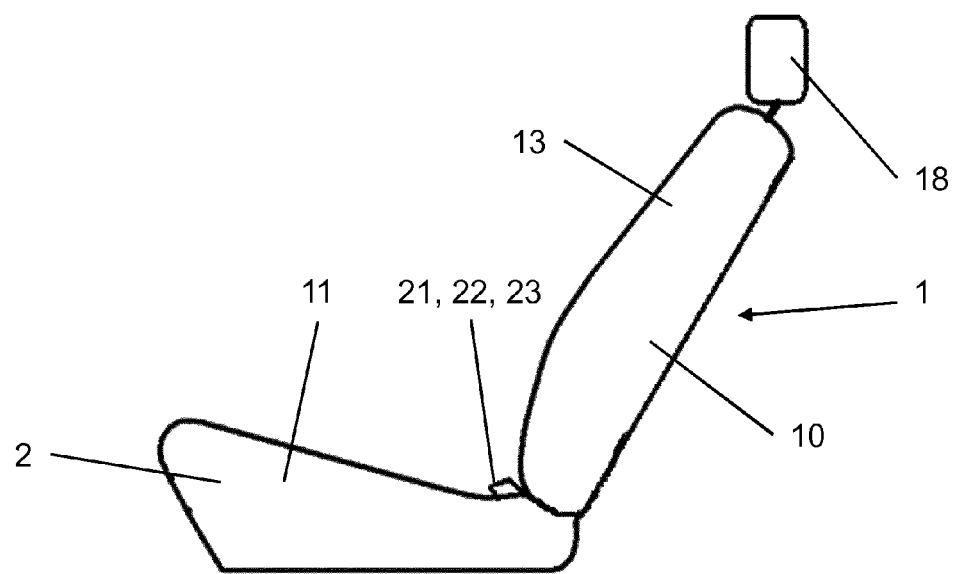
FIG. 1 is a schematic illustration of a vehicle seat in side view.
Figure 2:
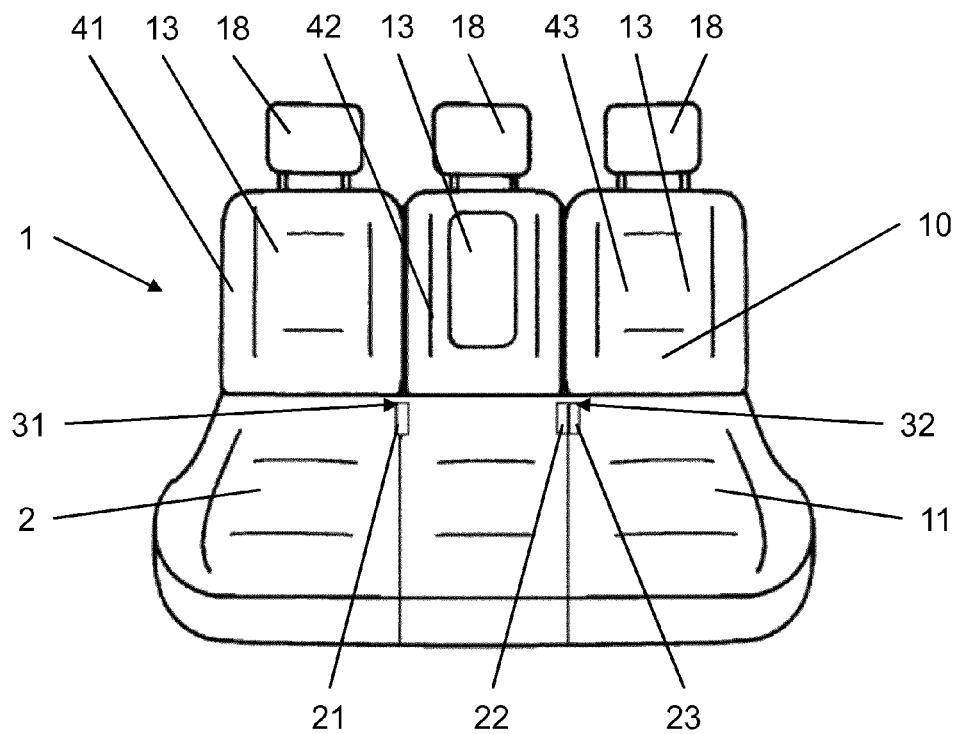
FIG. 2 is a schematic illustration of the vehicle seat from FIG. 1 as seen counter to the direction of travel.
Figure 3:
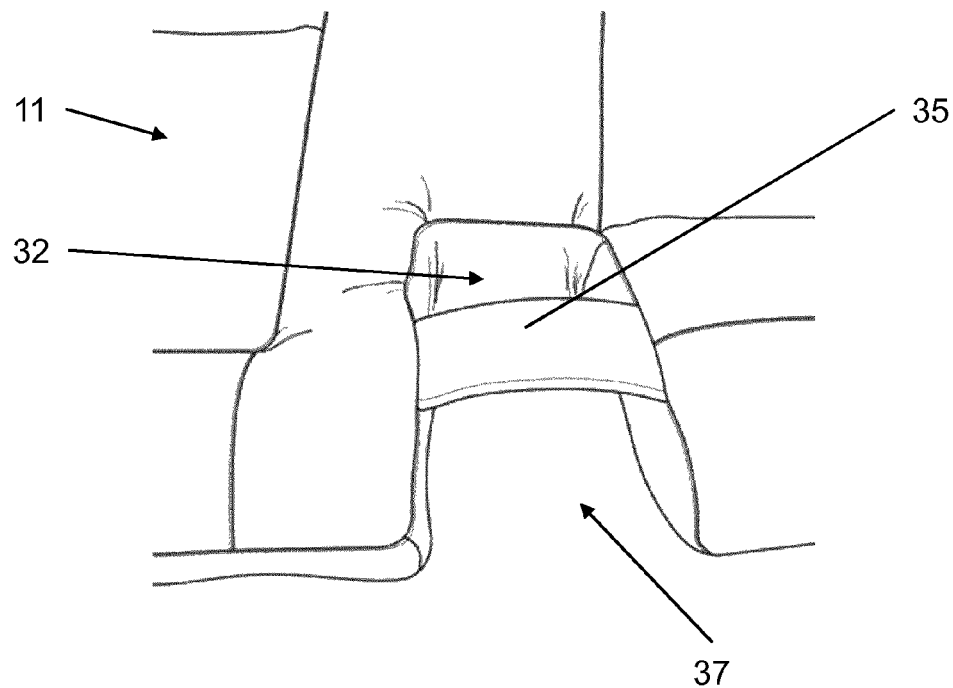
FIG. 3 is a partial perspective view showing a part of a seat cushion as seen in the direction of travel.
Figure 4:
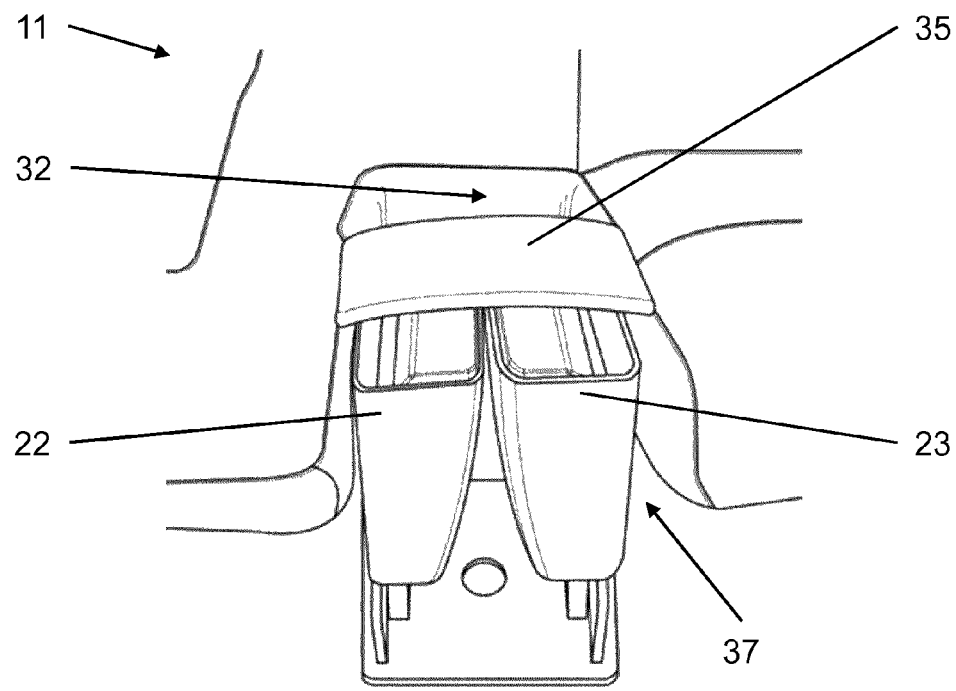
FIG. 4 is a partial perspective view showing the part of the seat cushion from FIG. 3 during the installation, as seen in the direction of travel.
Figure 5:
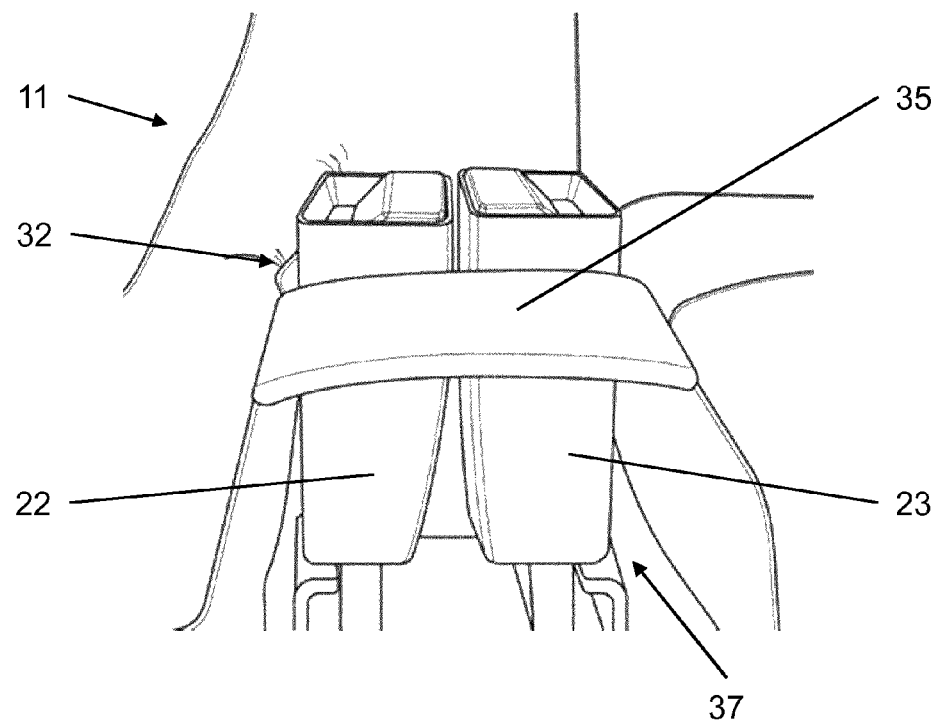
FIG. 5 is a partial perspective view showing the part of the seat cushion from FIG. 3 after the installation, as seen in the direction of travel.
Figure 6:
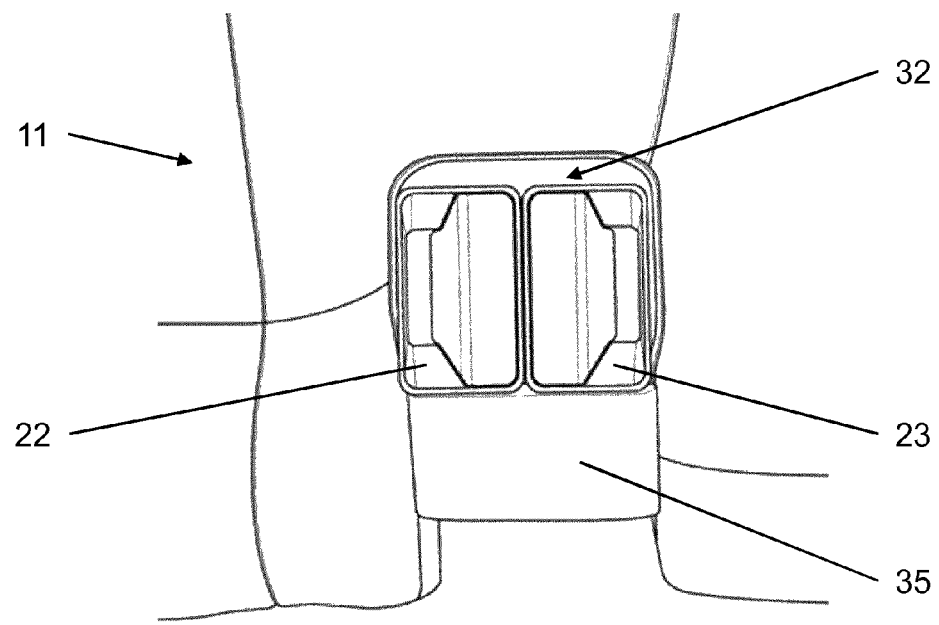
FIG. 6 is a top view showing the part of the seat cushion from FIG. 3 after the installation.

Referring to the drawings, a vehicle seat 1 for a motor vehicle has a seat part 2 and a backrest 10. The arrangement of the vehicle seat 1 within the vehicle and the customary direction of travel of the latter define the direction details used below. In this context, a direction oriented perpendicularly to the ground is referred to below as the vertical direction and a direction perpendicular to the vertical direction and perpendicular to the direction of travel is referred to below as the transverse direction.

The vehicle seat 1 in the present case is a rear seat which extends in the transverse direction approximately over the full width of the interior of the motor vehicle and which has three seats arranged next to one another in the transverse direction, namely a right seat 41 in the direction of travel, a center seat 42 and a left seat 43 in the direction of travel.

The seat part 2 comprises a seat cushion 11 which is designed as a foam part and extends in the transverse direction over the entire width of the vehicle seat 1. The seat cushion 11 is therefore assigned to each of the three seats 41, 42, 43. The seat cushion 11 extends counter to the direction of travel under the backrest 10.

The backrest 10 has three partial regions arranged next to one another in the transverse direction, wherein each seat 41, 42, 43 is assigned one of said partial regions. Each partial region of the backrest 10 is located above the seat cushion 11 in the vertical direction. Each partial region of the backrest 10 comprises a backrest pad 13 designed as a foam part.

Furthermore, a height-adjustable and inclination-adjustable headrest 18 is fitted on each upper end, in the vertical direction, of the partial regions of the backrest 10, which partial regions face away from the seat part 2. The headrests 18 also each comprise a foam part.

The seat cushion 11, the backrest pad 13 and the foam parts of the headrests 18 are covered by a cover, in the present case made of leather. The seat cushion 11, the backrest pad 13 and the foam parts of the headrests 18 decisively increase the seat comfort for an occupant of one of the seats 41, 42, 43 of the vehicle seat 1.

Each seat 41, 42, 43 of the vehicle seat 1 furthermore comprises a seatbelt (not illustrated) which is designed as a three-point belt. One end of each seatbelt is accommodated in an automatic belt roll-up mechanism (not illustrated) which rolls up the seatbelt when the latter is not in use. The automatic belt roll-up mechanism assigned to the center seat 42 is located in the central partial region of the backrest 10 in the vicinity of the end, which faces away from the seat part 2, in the vicinity of the headrest 18 of the center seat 42. The automatic belt roll-up mechanisms assigned to the two outer seats 41, 43 are located on the vehicle structure laterally next to the headrests 18 of the two outer seats 41, 43.

The other end of each seatbelt, on which a belt end fitting (not illustrated) is respectively arranged, is in each case fastened to the structure of the vehicle seat, in the present case to the seat part 2, in the present case is screwed there. Each belt end fitting here is located approximately perpendicularly in the vertical direction under the associated automatic belt roll-up mechanism.

A belt latch (likewise not illustrated) is arranged movably along each seatbelt. Each belt latch here comprises an opening through which the seatbelt reaches.

The vehicle seat 1 furthermore comprises three belt buckles 21, 22, 23 into which the belt latches of the seatbelts can be inserted. In this case, the first belt buckle 21 is assigned to the right seat 41 in the direction of travel, the second belt buckle 22 is assigned to the center seat 42 and the third belt buckle 23 is assigned to the left seat 43 in the direction of travel. The second belt buckle 22 and the third belt buckle 23 are arranged directly next to each other in the transverse direction.

If an occupant of a seat 41, 42, 43 of the vehicle seat 1 closes the associated seatbelt by inserting the corresponding belt latch into the associated belt buckle 21, 22, 23, the seatbelt runs from the belt end fitting, which is fastened to the structure of the vehicle seat, approximately in the transverse direction to the belt latch in the belt buckle 21, 22, 23, and from there obliquely upward in the vertical direction to the automatic belt roll-up mechanism arranged there.

In a rear region in the direction of travel, the seat cushion 11 has two recesses 31, 32 for receiving the belt buckles 21, 22, 23. The first recess 31 is located in the transverse direction between the seat 41 on the right in the direction of travel and the center seat 42 and receives the first belt buckle 21. The second recess 32 is located in the transverse direction between the left seat 43 in the direction of travel and the center seat 42 and receives the second belt buckle 22 and the third belt buckle 23.

The first recess 31 and the second recess 32 are of similar design, and therefore only the second recess 32 is discussed below. The first recess 31 differs from the second recess 32 essentially only in the extent in the transverse direction. The extent of the first recess 31 in the transverse direction corresponds to the width of the first belt buckle 21 and in the present case is approximately 4 cm. The extent of the second recess 32 in the transverse direction corresponds to the sum of the width of the second belt buckle 22 and of the third belt buckle 23 and in the present case is approximately 8 cm.

The second recess 32 extends completely through the seat cushion 11 in the vertical direction and is of approximately rectangular design in cross section perpendicularly to the vertical direction, i.e. in a plane defined by the direction of travel and the transverse direction. In the transverse direction, the second recess 32 is surrounded and bounded in each case on the right and left by the material of the seat cushion 11.

The second recess 32 begins at that end of the seat cushion 11 which is at the rear in the direction of travel and extends in the direction of travel into the seat cushion 11, in the present case with a width of approximately 20 cm. In the direction of travel, the second recess 32 is therefore likewise bounded by the material of the seat cushion 11. Counter to the direction of travel, the second recess 32 is therefore not bounded, but rather is open.

A bridge 35 extends in the transverse direction over the second recess 32 and spans the latter. The bridge 35 is of approximately rectangular design in cross section perpendicularly to the vertical direction, i.e. in a plane defined by the direction of travel and the transverse direction. The extent of the bridge 35 in the transverse direction therefore corresponds to the extent of the second recess 32 in the transverse direction. The bridge 35 is connected here on the right and left in the transverse direction to the material of the seat cushion 11.

In the direction of travel, the bridge 35 is arranged in such a manner that the front end, in the direction of travel, of the bridge 35 bears against the rear ends, in the direction of travel, of the belt buckles 22, 23. The bridge 35 extends from its front end to the rear counter to the direction of travel, wherein, in the present case, the rear end, in the direction of travel, of the bridge 35 touches at least one of the backrest pads 13 of the backrest 10. Alternatively, the bridge 35 can also extend counter to the direction of travel as far as the rear end of the seat cushion 11.

In the vertical direction, the bridge 35 has a relatively small extent in comparison to the seat cushion 11, in the present case approximately 1 cm. That surface of the bridge 35 which lies at the top in the vertical direction ends approximately flush with that surface of the seat cushion 11 which lies at the top in the vertical direction. A passage 37 through which the belt buckles 22, 23 can be passed during the installation is therefore provided in the vertical direction below the bridge 35.

The bridge 35 comprises a rubber band as core material. Alternatively, the core material of the bridge 35 can also be a different elastic material or else an inelastic material, for example a cloth. A combination or a composite of a plurality of different materials is also conceivable.

The core material of the bridge 35, the rubber band in this exemplary embodiment, is sewn onto the material of the seat cushion 11 on the right and left of the recess 32 in the transverse direction. In the present case, the core material of the bridge 35, which core material is designed as a rubber band, is covered by a cover made of leather. The optical impression of the bridge 35 therefore corresponds to that of the seat cushion 11. Of course, a cover made from a different material is also conceivable, or the cover can also be dispensed with.

A further bridge (not illustrated in detail) spans the first recess 31 in the same manner. Such a further bridge differs from the bridge 35 spanning the second recess 32 only in its extent in the transverse direction.

During the installation of the vehicle seat 1 in the motor vehicle, first of all the backrest pads 13 are fastened to the structure of the backrest 10 and the belt buckles 21, 22, 23 are fastened to the structure of the vehicle seat 1, in the present case to the structure of the seat part 2. The seat cushion 11 is subsequently mounted.

For this purpose, the seat cushion 11 is first of all positioned on the structure of the seat part 2 and is then pushed rearwards counter to the direction of travel. In the transverse direction, the seat cushion 11 is positioned in such a manner that the first belt buckle 21 is aligned in the direction of travel with the first recess 31 and the second belt buckle 22 and the third belt buckle 23 are aligned in the direction of travel with the second recess 32.

When the seat cushion 11 is displaced to the rear counter to the direction of travel, the first belt buckle 21 is received by the first recess 31 and the second belt buckle 22 and the third belt buckle 23 are received by the second recess 32.

The bridge 35 which partially bounds the second recess 32 upward in the vertical direction is slightly raised, and the two belt buckles 22, 23 pass through under the bridge 35 to that region of the second recess 32 which is free upward in the vertical direction. Similarly, the bridge which partially bounds the first recess 31 upward in the vertical direction is slightly raised and the first belt buckle 21 passes through under the bridge 35 to that region of the first recess 31 which is free upward in the vertical direction.

The seat cushion 11 is then pushed further counter to the direction of travel until a rear region, in the direction of travel, of the seat cushion 11 is located under the backrest cushion 13 of the backrest 10. The bridge which is assigned to the first recess 31, and the bridge 35 which is assigned to the second recess 32 are then located behind the belt buckles 21, 22, 23 in the direction of travel and conceal the recesses 31, 32 there upward in the vertical direction.

The features disclosed in the above description, the claims and the drawings may be of importance both individually and in combination for realizing the invention in its various refinements. While specific embodiments of the invention have been shown and described in detail to illustrate the application of the principles of the invention, it will be understood that the invention may be embodied otherwise without departing from such principles.

The invention claimed is:

1. A vehicle seat comprising:
   a backrest; and
   a seat part comprising a seat cushion, wherein:
   the seat cushion has at least one recess for receiving at least one belt buckle;
   the at least one recess is partially bounded upward in the vertical direction by a bridge, providing a free recess portion positioned between the backrest and the bridge that is not bounded upward in the vertical direction by the bridge, the bridge comprising a core material and a cover covering the core material, the core material extending in a vehicle seat transverse direction from a first side of the recess to an opposite second side of the recess; and
   the core material of the bridge is an elastic material.

2. A vehicle seat as claimed in claim 1, wherein the core material of the bridge is sewn onto material of the seat cushion on a first side and on a second side of the recess in a transverse direction.

3. A vehicle seat as claimed in claim 1, wherein the cover of the bridge is at least predominantly composed of leather.

4. A vehicle seat as claimed in claim 1, wherein the at least one recess has an extent, in a transverse direction, from the first side of the recess to the second side of the recess, that corresponds to a width of a belt buckle.

5. A vehicle seat as claimed in claim 1, wherein:
at least one recess is a first recess with an extent, in the transverse direction, that corresponds to a width of a belt buckle;
the seat cushion has a second recess with an extent, in a transverse direction corresponding to a sum of a width of a second belt buckle and a width of a third belt buckle.

6. A vehicle seat as claimed in claim 1, wherein a front end, with respect to a direction of travel, of the bridge is adapted to bear against a rear end, in the direction of travel, of the at least one belt buckle.

7. A vehicle seat as claimed in claim 1, wherein a surface of the bridge, which surface lies at a top in a vertical direction, ends at least approximately flush with a seat cushion surface of the seat cushion, which seat cushion surface lies at the top in the vertical direction.

8. A vehicle seat as claimed in claim 1, wherein a passage, through which the at least one belt buckle can be passed during installation, is provided, in a vertical direction, below the bridge.

9. A vehicle seat as claimed in claim 1, wherein the core material of the bridge is a rubber band.

10. A vehicle seat as claimed in claim 1, wherein the cover of the bridge is at least predominantly composed of cloth.

11. A vehicle seat as claimed in claim 1, wherein the seat cushion comprises a foam part.

12. A vehicle seat as claimed in claim 1, wherein the seat cushion extends in the transverse direction over an entire width of the vehicle seat.

13. A vehicle seat as claimed in claim 1, wherein the recess is of an approximately rectangular design in cross section with respect to a vertical direction.

14. A vehicle seat comprising:
a backrest; and
a seat part comprising:
a seat cushion defining a recess with recess side faces comprising a first side face and a second of the side face, the first side face being opposite the second side face and the first side face being spaced from the second side face in a vehicle seat transverse direction; and
bridge core material and a bridge cover covering the bridge core material, the bridge core material being connected to the cushion at a first side of the recess and being connected to the cushion at a second side of the recess and extending in a vehicle seat transverse direction across the recess to cover a portion of the recess between the first side face and the second of the side face and defining an uncovered seat buckle receiving portion of the recess positioned between the backrest and the bridge core material and between the first side face and the second side face, wherein the bridge core material is an elastic material, whereby the seat cushion may be moved relative to the at least one belt buckle with the at least one belt buckle moving past and under the bridge core material to receive the at least one belt buckle in the uncovered seat buckle receiving portion of the recess, wherein the bridge core material is sewn onto material of the seat cushion on the first side of the recess and on the second side of the recess.

15. A vehicle seat as claimed in claim 14, wherein the at least one recess has an extent, in the transverse direction, from the first side of the recess to the second side of the recess having a width of one belt buckle or having a width of two belt buckles.

16. A vehicle seat as claimed in claim 14, wherein a front end, with respect to a direction of travel, of one of the bridge core material and the bridge cover bears against a rear end, in the direction of travel, of the at least one belt buckle, with the at least one seat buckle in the receiving portion of the recess.

17. A vehicle seat as claimed in claim 14, wherein a surface of the bridge cover, which surface lies at a top in a vertical direction, ends at least approximately flush with a seat cushion surface of the seat cushion, which seat cushion surface lies at the top in the vertical direction, and the at least one belt buckle extends from within the recess to beyond the surface of the bridge with the at least one seat buckle in the receiving portion of the recess.

18. A vehicle seat as claimed in claim 17, wherein a passage, through which the at least one belt buckle can be passed during installation, is provided, in a vertical direction, below the bridge core material.

19. A vehicle seat comprising:
a backrest;
a belt buckle; and
a seat part comprising:
a seat cushion defining a recess with recess side faces comprising a first side face and a second of the side face, the first side face being opposite the second side face and the first side face being spaced from the second side face in a vehicle seat transverse direction; and
bridge core material and a bridge cover covering the bridge core material, the bridge core material being connected to the cushion at a first side of the recess and being connected to the cushion at a second side of the recess and extending in a vehicle seat transverse direction across the recess to cover a portion of the recess between the first side face and the second side face defining an uncovered belt buckle receiving portion of the recess between the backrest and the bridge core material and between the first side face and the second side face, wherein the bridge core material is an elastic material, wherein a surface of the bridge cover, which surface lies at a top in a vertical direction, ends at least approximately flush with a seat cushion surface of the seat cushion, which seat cushion surface lies at the top in the vertical direction, and at least a portion of the at least one belt buckle is extendable from within the recess to beyond the surface of the bridge cover with the at least one seat buckle in the belt buckle receiving portion of the recess, whereby for installation the seat cushion may be moved relative to the at least one belt buckle with the at least one belt buckle moving past and under the bridge core material to receive the at least one belt buckle in the uncovered portion of the belt buckle receiving portion of the recess.

20. A vehicle seat as claimed in claim 19, wherein the bridge core material is sewn onto material of the seat cushion on the first side of the recess and on the second side of the recess.

* * * * *